US011409827B2

(12) United States Patent
Lee

(10) Patent No.: US 11,409,827 B2
(45) Date of Patent: *Aug. 9, 2022

(54) PROVIDING ELECTRONIC SEARCH AND GUIDANCE USING NON-ADDRESS DESTINATION DESIGNATIONS

(71) Applicant: Katharine Gillian Lee, Columbus, GA (US)

(72) Inventor: Katharine Gillian Lee, Columbus, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/921,340

(22) Filed: Jul. 6, 2020

(65) Prior Publication Data
US 2021/0109985 A1 Apr. 15, 2021

Related U.S. Application Data

(63) Continuation of application No. 16/132,896, filed on Sep. 17, 2018, now Pat. No. 10,706,116, which is a continuation of application No. 14/510,105, filed on Oct. 8, 2014, now Pat. No. 10,078,705.

(60) Provisional application No. 61/888,101, filed on Oct. 8, 2013.

(51) Int. Cl.
G06F 3/048 (2013.01)
G06F 16/9537 (2019.01)
G01C 21/36 (2006.01)

(52) U.S. Cl.
CPC ..... G06F 16/9537 (2019.01); G01C 21/3605 (2013.01); G06F 3/048 (2013.01)

(58) Field of Classification Search
None
See application file for complete search history.

(56) References Cited

U.S. PATENT DOCUMENTS

| 8,538,956 B1* | 9/2013 | Szabadka | G06F 16/29 707/724 |
| 2004/0243299 A1 | 12/2004 | Scaer et al. | |
| 2009/0109216 A1* | 4/2009 | Uetabira | G06F 16/9577 345/419 |
| 2010/0106400 A1* | 4/2010 | Park | G01C 21/3611 701/533 |
| 2013/0345962 A1* | 12/2013 | van Os | G09B 29/007 701/412 |
| 2015/0169749 A1* | 6/2015 | Camelo | G06F 16/951 707/706 |

FOREIGN PATENT DOCUMENTS

WO 2014170646 A1 10/2014

* cited by examiner

Primary Examiner — Xuyang Xia
(74) Attorney, Agent, or Firm — Perilla Knox & Hildebrandt LLP

(57) ABSTRACT

Disclosed are various embodiments for providing electronic search and guidance using non-address destination designations. In one embodiment, a particular feature identifier is selected via a client device. A particular geographic location corresponding to the particular feature identifier is determined. Navigation instructions to the geographic location and/or a map showing the geographic location are presented via the client device.

20 Claims, 8 Drawing Sheets

154a

154b

154d

PROVIDING ELECTRONIC SEARCH AND GUIDANCE USING NON-ADDRESS DESTINATION DESIGNATIONS

CROSS-REFERENCE TO RELATED APPLICATIONS

This application is a continuation of, and claims priority to, co-pending U.S. Patent Applications entitled "PROVIDING ELECTRONIC SEARCH AND GUIDANCE USING NON-ADDRESS DESTINATION DESIGNATIONS," filed on Sep. 17, 2018, and assigned application Ser. No. 16/132,896, which is a continuation of, and claims priority to, U.S. Patent Applications entitled "PROVIDING ELECTRONIC SEARCH AND GUIDANCE USING NON-ADDRESS DESTINATION DESIGNATIONS," filed on Oct. 8, 2014, assigned application Ser. No. 14/510,105, issued on Sep. 18, 2018, and assigned U.S. Pat. No. 10,078,705, which claims the benefit of U.S. Provisional Application No. 61/888,101, entitled "System and method for providing electronic search and guidance using non-address destination designations," and filed on Oct. 8, 2013, all of which are incorporated herein by reference in their entireties.

BACKGROUND

Prior to the twenty-first century, people used to navigate around unfamiliar environments through the use of printed maps. Such maps varied in size and detail presented. For example, a map for a state might show only major highways in the state, while a map for a city might show every street in the city. Unfortunately, such maps were cumbersome to use, especially while driving and in low visibility conditions, and became outdated due to changes in street names, newly constructed roads, changes in traffic patterns, etc.

In the late 1990s, the global positioning system (GPS) became operational. GPS enabled a person to determine his or her geographic location by using an electronic device equipped to receive signals from a group of GPS satellites. Dedicated navigational devices became commonplace, with display screens and audio capability to direct users via turn-by-turn navigation backed by GPS. More recently, smartphones with GPS capability have become available. Unlike standalone devices, GPS-equipped smartphones may be automatically kept up to date with the latest navigational data. GPS-equipped smartphones are quickly replacing standalone GPS units, though standalone GPS units have the advantage of working in areas without a data signal to supply navigational data.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing electronic search and guidance using non-address destination designations. United States military installations are notorious for being difficult to navigate by a person who is new to the area. Because of the frequent transfers from one base to another, called a Permanent Change of Station ("PCS"), the difficulty is relentlessly and repeatedly magnified. The present disclosure solves this problem by providing real-time navigation and guidance without the use of ordinary street names or addresses. It is often the case that street names or addresses are not available to mobile devices, or on the internet at all, when the addresses are within the secure areas of military installations. Existing mapping and navigation applications and maps are therefore useless because the addresses for buildings on base simply appear to be at the gate to the base when they are searched.

By mapping each building on the military installation to a set of coordinates, users who are seeking a particular building can find it by its number using the application on their mobile device or smartphone. Building number is, by far, the most common identification for any building on a United States military installation, whether it be Army, Navy, Air Force, Marines, National Guard or Coast Guard. Some of the buildings can be quite large, so there may be multiple sets of coordinates for different entrances or even other types of location data for locations inside the building.

As long as a building, field, training area, range, or any kind of other structure or feature has a unique identifier or can be provided a unique identifier that the user can understand, it may be searchable and mappable by the database/application combination described herein. In the following discussion, a general description of the system and its components is provided, followed by a discussion of the operation of the same.

Figure 1:
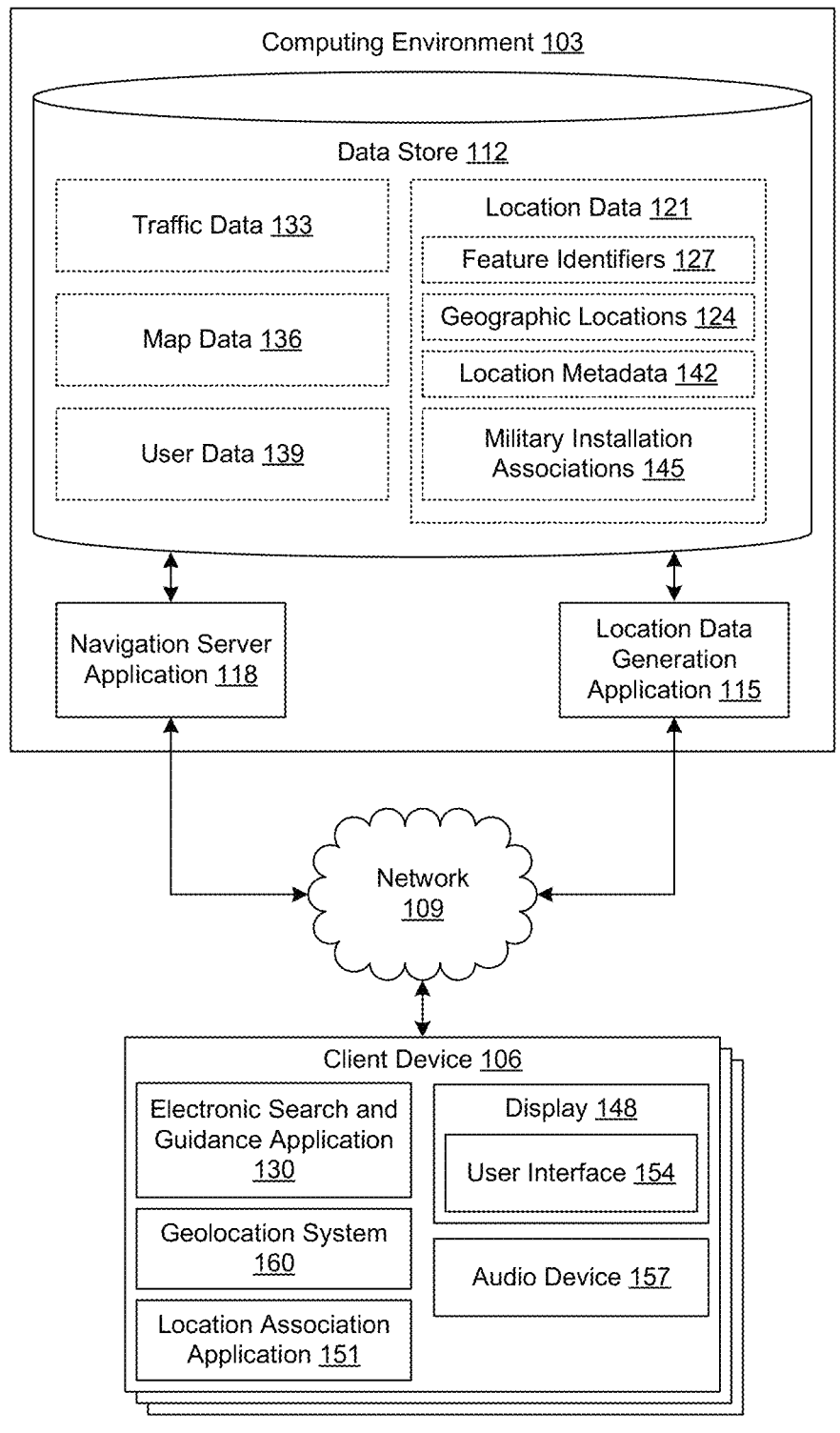
FIG. 1 is a schematic block diagram of a networked environment according to various embodiments of the present disclosure.

With reference to FIG. 1, shown is a networked environment 100 according to various embodiments. The networked environment 100 includes a computing environment 103 and one or more client devices 106, which are in data communication with each other via a network 109. The network 109 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted or "cloud" computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include a location data generation application 115, a navigation server application 118, and other applications, services, processes, systems, engines, or functionality not discussed in detail herein. The location data generation application 115 is executed to generate and/or update location data 121, which includes associations between geographic locations 124 and feature identifiers 127, among other data. The navigation server application 118 is executed to provide navigation data and/or other backend support to client devices 106 that execute an electronic search and guidance application 130.

The data stored in the data store 112 includes, for example, location data 121, traffic data 133, map data 136, user data 139, and potentially other data. The location data 121 maintains associations or mappings between feature identifiers 127 and geographic locations 124. The feature identifiers 127 may correspond to building numbers, field identifiers, training area identifiers, range identifiers, and/or other unique identifiers for destination features. It is noted that the feature identifiers 127 do not correspond to address information or street addresses. In one scenario, the feature identifiers 127 all correspond to unique features upon one or more military installations. In other scenarios, the feature identifiers 127 correspond to unique features of schools, university campuses, corporate campuses, etc. The feature identifiers 127 may correspond to building numbers, room numbers, door numbers, etc.

The geographic locations 124 may correspond to data representations of specific locations, e.g., a set of coordinates including latitude and longitude. In some cases, a geographic location 124 may correspond to a geographic area with a bounding box, bounding radius, or other boundary being defined. The location data 121 may also include location metadata 142, military installation associations 145, and/or other data. The location metadata 142 may include names, titles, descriptions, images, ratings, user reviews and comments, and/or other data associated with a given feature.

In one embodiment, the military installation associations 145 associate specific feature identifiers 127 and geographic locations 124 with a specific military installation. It is noted that in one embodiment, the feature identifiers 127 are unique across all military installations, while in another embodiment, the feature identifiers 127 are unique to a particular military installation and may be reused in connection with other military installations.

The traffic data 133 may record historic and/or current traffic relating to routes to and/or from the geographic locations 124. The map data 136 enables generation of maps and determination of routes to and/or from geographic locations 124. To this end, the map data 136 may include roads, directionality of roads, turn lane information, whether U-turns are permitted, average time to traverse a road segment, speed limits, bodies of water, boundaries, place names, and/or other information.

The user data 139 may record various information about users of the system. In one embodiment, a user is required to have an active account in order to leverage the resources of the navigation server application 118. Similarly, an account may be necessary to provide updated information to the location data generation application 115. The user data 139 may include user names, security credentials, cookie information, known internet protocol (IP) addresses, etc., used to authenticate users. For instance, a user may be required to enter a valid username and password combination to use the electronic search and guidance application 130. In particular, authentication may be required in order to maintain security of the information when deemed necessary by military installations, universities, corporations, and so on.

The client device 106 is representative of a plurality of client devices that may be coupled to the network 109. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 148. The display 148 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as an electronic search and guidance application 130, a location association application 151, and/or other applications. The electronic search and guidance application 130 may be executed in a client device 106, for example, to access network content served up by the computing environment 103 and/or other servers, thereby rendering a user interface 154 on the display 148. To this end, the electronic search and guidance application 130 may comprise, for example, a browser, a dedicated application, etc., and the user interface 154 may comprise a network page, an application screen, etc.

In particular, the electronic search and guidance application 130 may be used to identify locations of features upon military installations, college campuses, corporate campuses, etc. Such features were previously hard to find as they were not associated with street addresses or geographic locations. The electronic search and guidance application 130 may facilitate mapping, routing, and/or other operations involving the locations of these features. The location association application 151 may facilitate generation of associations between feature identifiers 127 and geographic locations 124 based at least in part on a current location of the client device 106. The client device 106 may be configured to execute applications beyond the electronic search and guidance application 130 and the location association application 151 such as, for example, email applications, social networking applications, word processors, spreadsheets, and/or other applications.

The client device 106 may also include one or more audio devices 157 and a geolocation system 160. The audio devices 157 may include speakers, microphones, line-in interfaces, line-out interfaces, and so on. The geolocation system 160 may include a global positioning system (GPS) receiver, a global navigation satellite system (GLONASS) receiver, and/or other receivers to determine locations. The geolocation system 160 may determine location based at least in part on detected WI-FI networks and/or cell towers of known locations via triangulation procedures.

Next, a general description of the operation of the various components of the networked environment 100 is provided. To begin, the location data 121 may be created for various military installations, college campuses, corporate campuses, etc. In one embodiment, a user visits various features of the military installations, etc. and utilizes a user interface 154 of the location association application 151 to specify a feature identifier 127 (e.g., a building number, facility ID, etc.). The user may be required to enter a username and password or other security credential in order to authenticate to the computing environment 103.

The geolocation system 160 of the client device 106 may be used to automatically obtain a current location of the client device 106. The current location may then be associated with and mapped to the feature identifier 127. The location association application 151 may then transmit the association to the location data generation application 115, which may then generate the location data 121 in the data store 112. Additional location metadata 142 such as current picture or other data may be added. In this way, numerous locations may be visited and many military installation associations 145 may be created.

In other embodiments, associations may be manually generated via plotting coordinates of geographic locations 124 upon a map, or by importing from a list of geographic locations 124.

Subsequently, a user may launch the electronic search and guidance application 130 on the same client device 106 or a different client device 106. In some cases, to ensure proper security of the location data 121 or for other reasons, the user may be required to log in via a username, password, biometric identification, etc. in a user interface 154.

The user may indicate a specific military installation or campus in a user interface 154. In some cases, this may be selected from a list containing a plurality of identifiers of military installations or campuses. Then the user may enter a feature identifier 127 via a user interface 154, such as a building identifier, building number, or other identifier that is not a portion of a street address. In some situations, the user may enter only a portion of the feature identifier 127 and a listing of potential feature identifiers 127 may be shown in an auto-complete style interface. This listing may be populated with data obtained from the navigation server application 118. Ultimately, the user selects or specifies a particular feature identifier 127.

The electronic search and guidance application 130 then determines a correlation between the feature identifier 127 and a geographic location 124. For instance, the electronic search and guidance application 130 may send a request to the navigation server application 118 to determine the geographic location 124. Alternatively, the location data 121 may be stored locally upon the client device 106 in the case of cached location data 121 or a non-networked client device 106.

Based upon the geographic location 124, the electronic search and guidance application 130 may render a map with an indicium indicating the geographic location 124. For example, a pin point, circle, or other marker may be rendered. A text label showing the feature identifier 127 may be rendered in connection with the map.

Additionally, the electronic search and guidance application 130 may facilitate navigational routing from one location to another. In this regard, the user may enter a specific starting location in a user interface 154. Alternatively, the user may specify that a current location determined by the geolocation system 160 is to be used. The electronic search and guidance application 130 may submit a request to the navigation server application 118 to determine the route. Alternatively, the electronic search and guidance application 130 may be able to determine the route using cached data or if the electronic search and guidance application 130 is in a self-contained client device 106.

The shortest route may be determined, and in some cases, several routes may be determined and presented to the user. The traffic data 133 may be leveraged to find a route with a shortest traffic time. In some cases, current and/or historical traffic loads for route segments may be presented in a map user interface 154.

The electronic search and guidance application 130 may be configured to cause a map to be rendered that visually indicates the route, e.g., highlighting roads to be traversed. In some cases, the electronic search and guidance application 130 may render a listing of specific navigational instructions in the user interface 154. Turn by turn navigation may be provided in real time, via the user interface 154 and/or via audio emitted by the audio device 157.

Figure 2A:
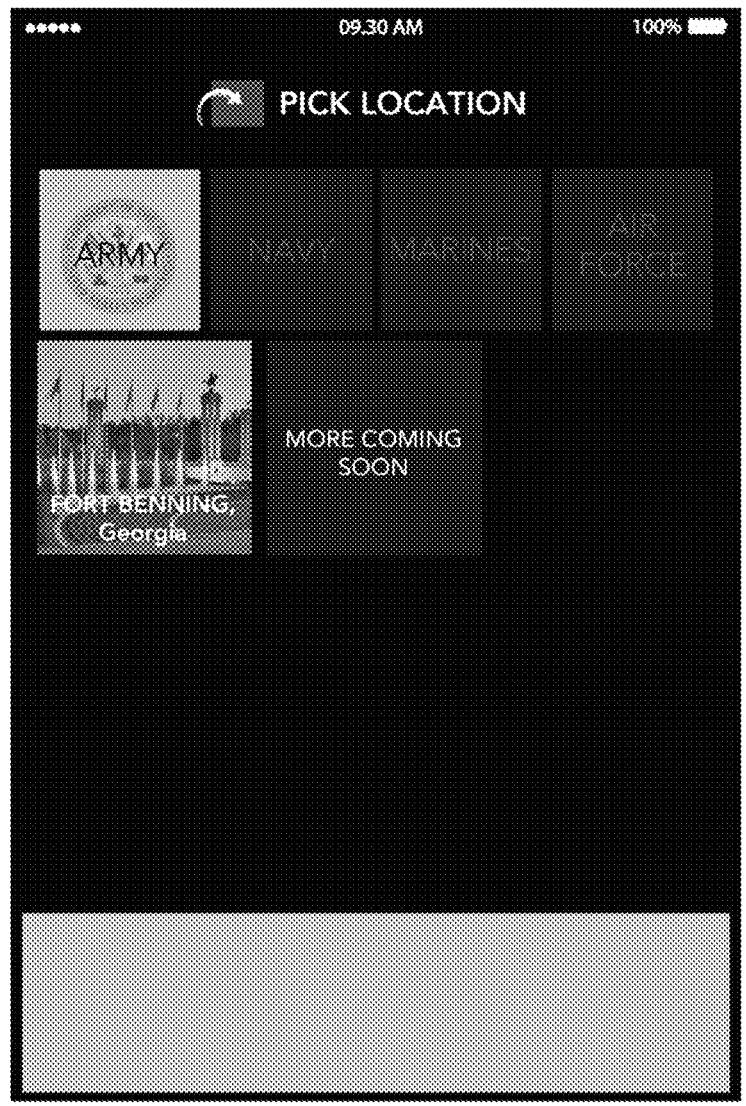
FIGS. 2A-2D are pictorial diagrams of example user interfaces rendered by a client device in the networked environment of FIG. 1 according to various embodiments of the present disclosure.

Referring next to FIG. 2A, shown is one example of a user interface 154a corresponding to the electronic search and guidance application 130 (FIG. 1). In FIG. 2A, the user interface 154a allows for a selection from among various military installations. The military installations may be organized by branch of service, e.g., Army, Navy, Marines, Air Force, and so on. By selecting a particular icon, the user is able to identify a particular military installation or search among another screen with listings of particular military installations.

Figure 2B:
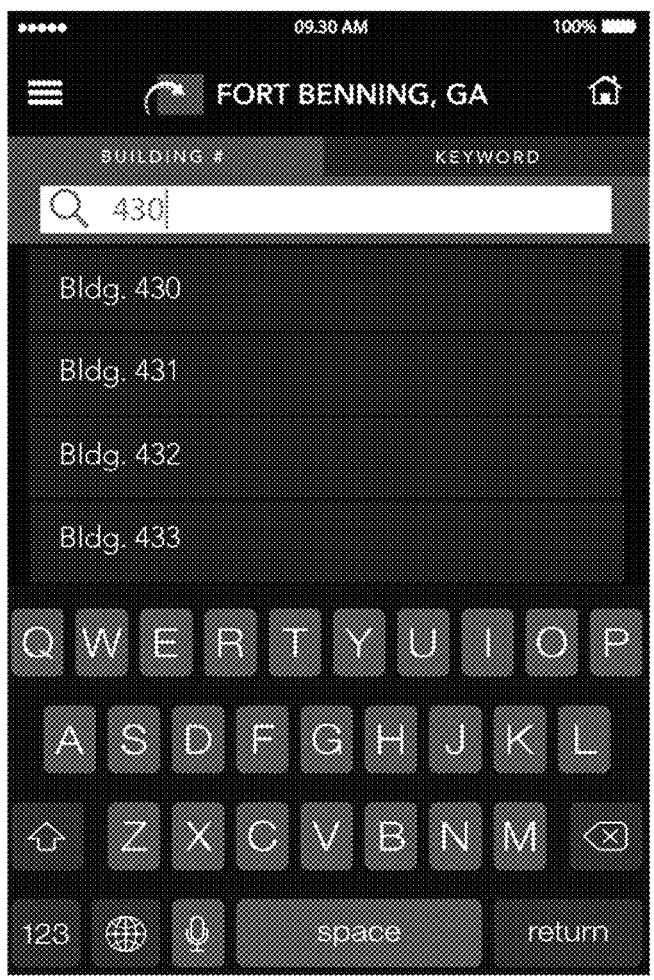

Turning now to FIG. 2B, shown is one example of a user interface 154b corresponding to the electronic search and guidance application 130 (FIG. 1). In FIG. 2B, the user interface 154b allows a user to enter a specific feature identifier 127 (FIG. 1) such as a building number. An automatic completion feature indicates predefined feature identifiers 127 for the specific military installation that complete or are similar to the entered text string. An on-screen keyboard is shown to facilitate user input. In some cases, the user may dictate the input via a microphone or attached BLUETOOTH device. To the extent that military security is at issue when publishing the coordinates of specific buildings and installations, the abstracted and arbitrary nature of numbering buildings prevents any correlation to any type of activity or potential target. The unique identifiers of building numbers and names may be replaced with user-supplied data, such as crowd-sourced naming conventions, popularized destinations acquiring nicknames, images of the location becoming its de facto identifier as images are now searchable, or even just the coordinates themselves.

Figure 2C:
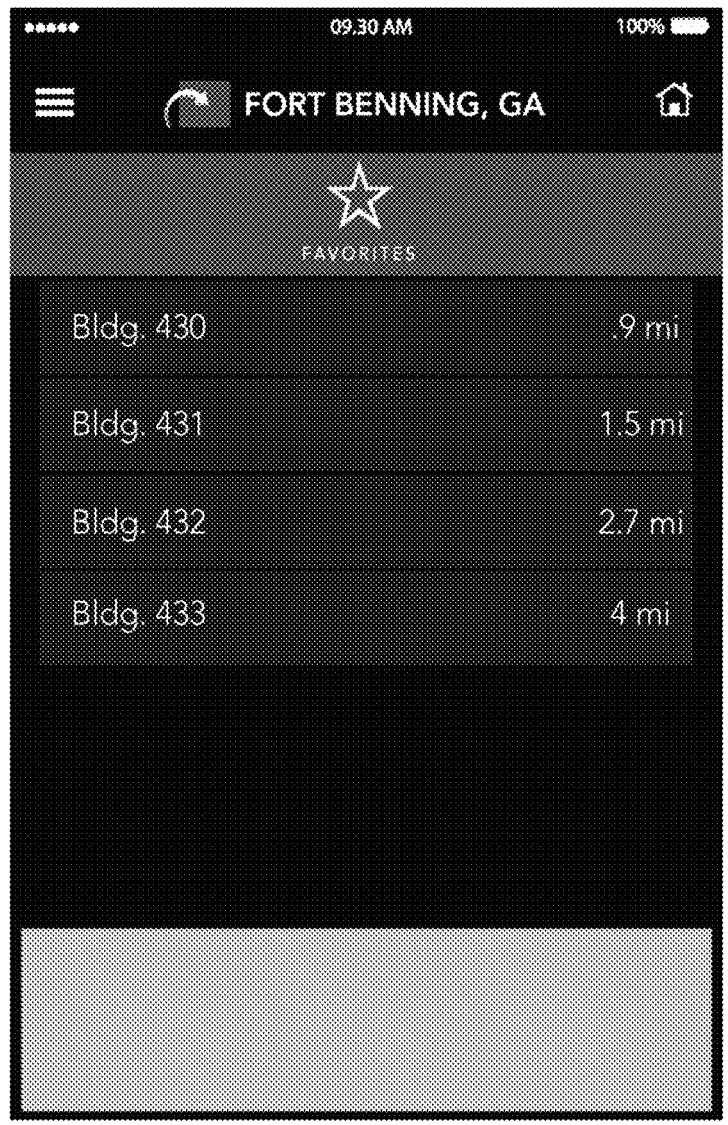

Moving on to FIG. 2C, shown is one example of a user interface 154c corresponding to the electronic search and guidance application 130 (FIG. 1). The user interface 154c lists various feature identifiers 127 (FIG. 1) of a military installation that are indicated as favorites. The geographic locations 124 (FIG. 1) of the corresponding features are compared with the current location of the client device 106 (FIG. 1) to obtain a distance. When the user selects one of the features, a map indicating the feature may be shown, or directions from the current location to the feature may be provided.

Figure 2D:
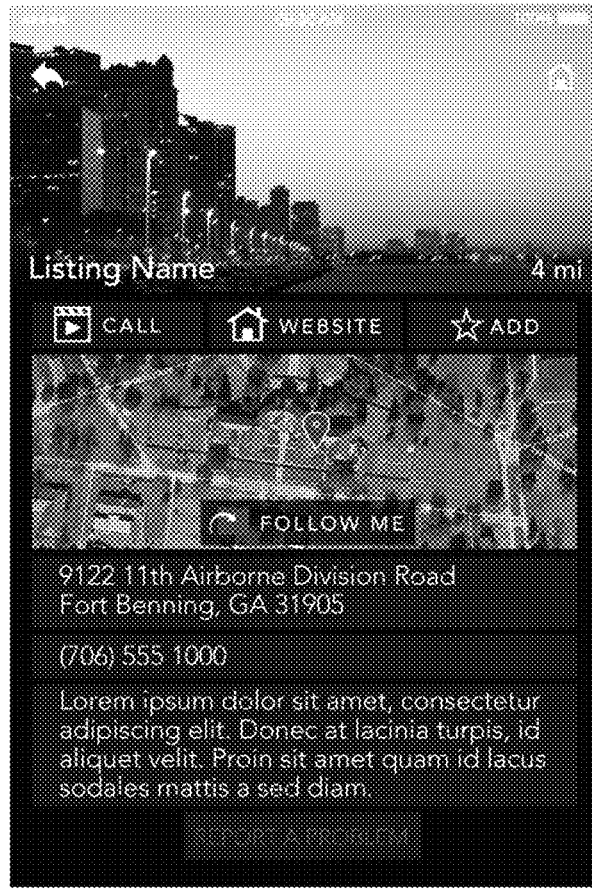

Continuing to FIG. 2D, shown is one example of a user interface 154*d* corresponding to the electronic search and guidance application 130 (FIG. 1). The user interface 154*d* corresponds to a detail screen for a specific feature. Various elements of the location metadata 142 (FIG. 1) may be rendered, including street address, phone number, description, reviews, and so on. A map may be rendered with a push pin or other indicium that shows the geographic location 124 (FIG. 1) of the feature.

Figure 3:
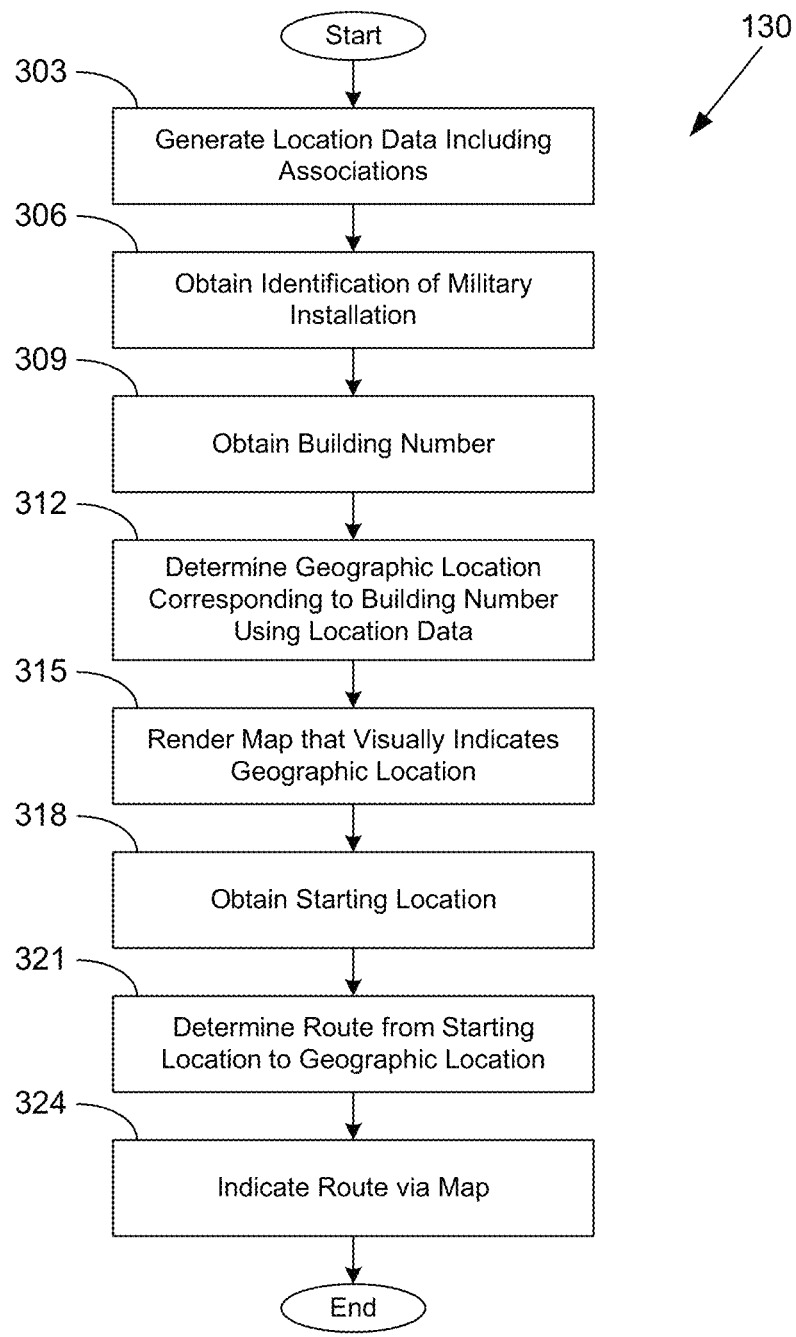
FIG. 3 is a flowchart illustrating one example of functionality implemented as portions of an electronic search and guidance application executed in a client device in the networked environment of FIG. 1 according to various embodiments of the present disclosure.

Referring next to FIG. 3, shown is a flowchart that provides one example of the operation of a portion of the electronic search and guidance application 130 according to various embodiments. It is understood that the flowchart of FIG. 3 provides merely an example of the many different types of functional arrangements that may be employed to implement the operation of the portion of the electronic search and guidance application 130 as described herein. As an alternative, the flowchart of FIG. 3 may be viewed as depicting an example of elements of a method implemented in the computing environment 103 (FIG. 1) according to one or more embodiments.

Beginning with box 303, the location data 121 (FIG. 1) is generated via the location data generation application 115 (FIG. 1). In box 306, the electronic search and guidance application 130 obtains an identification of a military installation. In box 309, the electronic search and guidance application 130 obtains a building number or another feature identifier 127 (FIG. 1) that does not correspond to a street address or a portion of a street address.

In box 312, the electronic search and guidance application 130 determines a geographic location 124 (FIG. 1) corresponding to the building number using the location data 121. In box 315, the electronic search and guidance application 130 renders a user interface 154 (FIG. 1) including a map that visually indicates the geographic location 124.

In box 318, the electronic search and guidance application 130 obtains a starting location. In box 321, the electronic search and guidance application 130 determines a route from the starting location to the geographic location 124. In box 324, the electronic search and guidance application 130 indicates the route via updating the map. The electronic search and guidance application 130 may also provide navigational instructions, e.g., turn by turn navigation to the geographic location 124 in real time. Thereafter, the portion of the electronic search and guidance application 130 ends.

Figure 4:
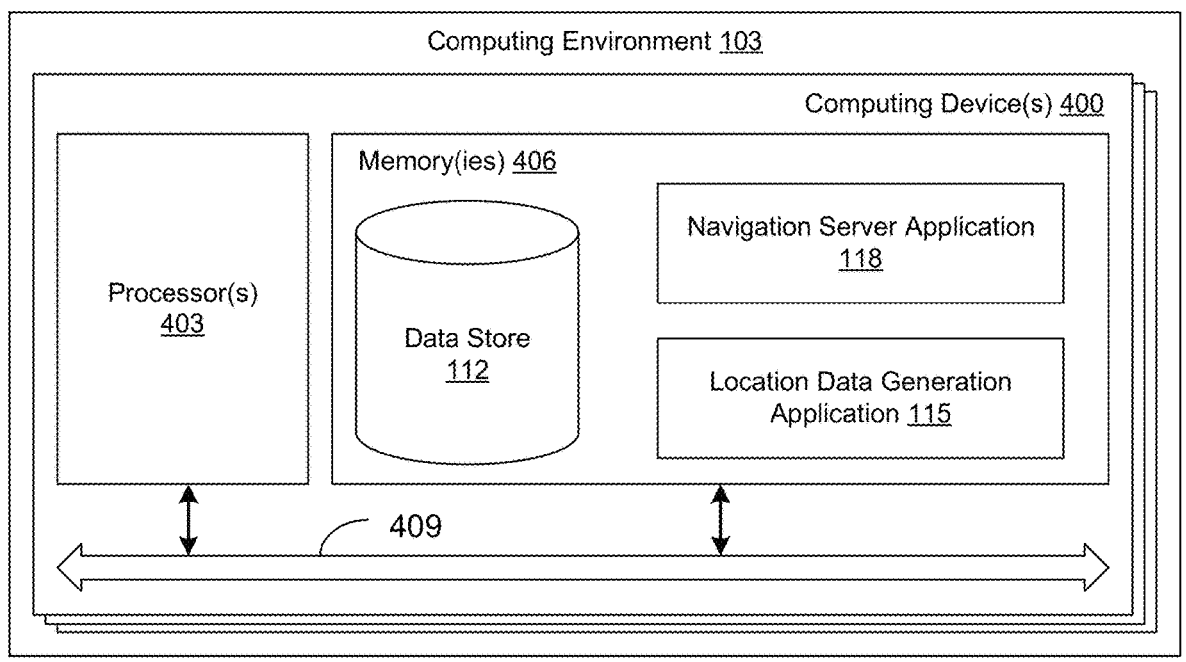
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the navigation server application 118, the location data generation application 115, and potentially other applications. Also stored in the memory 406 may be a data store 112 and other data. In addition, an operating system may be stored in the memory 406 and executable by the processor 403.

Figure 5:
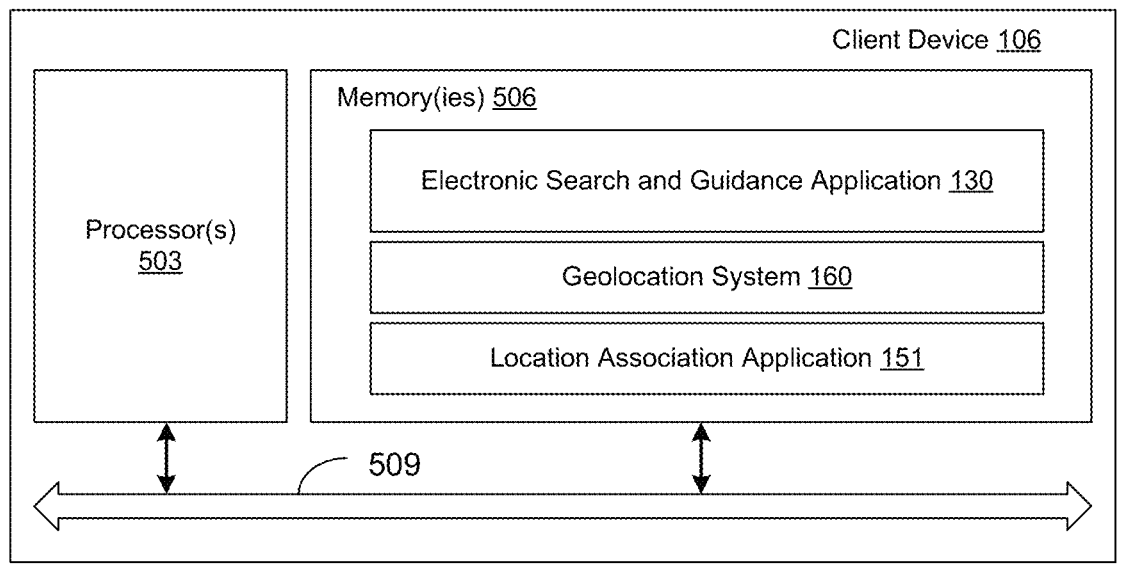
FIG. 5 is a schematic block diagram that provides one example illustration of a client device employed in the networked environment of FIG. 1 according to various embodiments of the present disclosure.

With reference to FIG. 5, shown is a schematic block diagram of the client device 106 according to an embodiment of the present disclosure. The client device 106 includes at least one processor circuit, for example, having a processor 503 and a memory 506, both of which are coupled to a local interface 509. The local interface 509 may comprise, for example, a data bus with an accompanying address/control bus or other bus structure as can be appreciated. A display 148 (FIG. 1), a location-finding device, a cellular transceiver, an audio device 157 (FIG. 1), and/or other devices may be coupled to the local interface 509.

Stored in the memory 506 are both data and several components that are executable by the processor 503. In particular, stored in the memory 506 and executable by the processor 503 are the electronic search and guidance application 130, the geolocation system 160, the location association application 151, and potentially other applications. Also stored in the memory 506 may be a data store and other data. In addition, an operating system may be stored in the memory 506 and executable by the processor 503.

Referring now to both FIGS. 4 and 5, it is understood that there may be other applications that are stored in the memory 406, 506 and are executable by the processor 403, 503 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 406, 506 and are executable by the processor 403, 503. In this respect, the term "executable" means a program file that is in a form that can ultimately be run by the processor 403, 503. Examples of executable programs may be, for example, a compiled program that can be translated into machine code in a format that can be loaded into a random access portion of the memory 406, 506 and run by the processor 403, 503, source code that may be expressed in proper format such as object code that is capable of being loaded into a random access portion of the memory 406, 506 and executed by the processor 403, 503, or source code that may be interpreted by another executable program to generate instructions in a random access portion of the memory 406, 506 to be executed by the processor 403, 503, etc. An executable program may be stored in any portion or component of the memory 406, 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406, 506 is defined herein as including both volatile and nonvolatile memory and data storage components. Volatile components are those that do not retain data values upon loss of power. Nonvolatile components are those that retain data upon a loss of power. Thus, the memory 406, 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403, 503 may represent multiple processors 403, 503 and/or multiple processor cores and the memory 406, 506 may represent multiple memories 406, 506 that operate in parallel processing circuits, respectively. In such a case, the local interface 409, 509 may be an appropriate network that facilitates communication between any two of the multiple processors 403, 503, between any processor 403, 503 and any of the memories 406, 506, or between any two of the memories 406, 506, etc. The local interface 409, 509 may comprise additional systems designed to coordinate this communication, including, for example, performing load balancing. The processor 403, 503 may be of electrical or of some other available construction.

Although the navigation server application 118, the location data generation application 115, the electronic search and guidance application 130, the geolocation system 160, the location association application 151, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the electronic search and guidance application 130. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403, 503 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the navigation server application 118, the location data generation application 115, the electronic search and guidance application 130, the geolocation system 160, and the location association application 151, that comprises software or code can be embodied in any non-transitory computer-readable medium for use by or in connection with an instruction execution system such as, for example, a processor 403, 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the navigation server application 118, the location data generation application 115, the electronic search and guidance application 130, the geolocation system 160, and the location association application 151, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   determining, by at least one computing device, a specific military installation;
   receiving, by the at least one computing device, a numerical identifier of a military installation feature from an application, wherein the numerical identifier is not a portion of a street address, the numerical identifier of the military installation feature uniquely identifies a feature upon the specific military installation, and individual ones of a plurality of features on the specific military installation are assigned one of a plurality of unique numerical identifiers;
   determining, by the at least one computing device, a geographic location corresponding to the numerical identifier of the military installation feature based in part on the specific military installation and location data that maps the numerical identifier of the military installation feature to the geographic location, the geographic location being determined without reference to a user-supplied street address; and
   presenting, by an output device of the at least one computing device, navigation instructions to the geographic location.

2. The method of claim 1, wherein determining the specific military installation further comprises receiving, by the at least one computing device, an identifier of the specific military installation from the application.

3. The method of claim 1, wherein the application comprises a web browser.

4. The method of claim 1, wherein the numerical identifier of the military installation feature is received in response to a user selecting the numerical identifier via a user interface rendered by the application.

5. The method of claim 1, wherein the numerical identifier of the military installation feature is received in response to a user specifying the numerical identifier via a user interface rendered by the application.

6. The method of claim 1, wherein receiving the numerical identifier of the military installation feature further comprises receiving the numerical identifier dictated by a user via a microphone.

7. The method of claim 1, wherein the output device is an audio device, and the navigation instructions are presented as audio emitted by the audio device.

8. The method of claim 1, further comprising:
   receiving, by the at least one computing device, a starting location from the application;
   determining, by the at least one computing device, a route from the starting location to the geographic location; and
   wherein the navigation instructions are based at least in part on the route.

9. A method comprising:
   determining, by at least one computing device, a specific military installation;
   receiving, by the at least one computing device, a numerical identifier of a military installation feature from an application, wherein the numerical identifier is not a portion of a street address, the numerical identifier of the military installation feature uniquely identifies a feature upon the specific military installation, and individual ones of a plurality of features on the specific military installation are assigned one of a plurality of unique numerical identifiers;
   determining, by the at least one computing device, a geographic location corresponding to the numerical identifier of the military installation feature based in part on the specific military installation and location data that maps the numerical identifier of the military installation feature to the geographic location, the geographic location being determined without reference to a user-supplied street address; and
   presenting, by an output device of the at least one computing device, a map that visually indicates the geographic location.

10. The method of claim 9, wherein the map includes a route to the geographic location.

11. The method of claim 9, wherein the application comprises a web browser.

12. The method of claim 9, wherein the numerical identifier of the military installation feature is received in response to a user selecting the numerical identifier via a user interface rendered by the application.

13. A system comprising:
    at least one computing device; and
    instructions that cause the at least one computing device to at least:
      determine a specific military installation;
      receive an identifier of a military installation feature from a client device, wherein the identifier is not a portion of a street address, the identifier of the military installation feature uniquely identifies a feature upon the specific military installation, and individual ones of a plurality of features on the specific military installation are assigned one of a plurality of unique identifiers;
      determine a geographic location corresponding to the identifier of the military installation feature based in part on the specific military installation and location data that maps the identifier of the military installation feature to the geographic location, the geographic location being determined without reference to a user-supplied street address; and
      generate a map that visually indicates the geographic location.

14. The system of claim 13, wherein the map includes a pin point or a circle at the geographic location.

15. The system of claim 13, wherein the map includes a text label showing the identifier.

16. The system of claim 13, wherein the instructions further cause the at least one computing device to at least send the map to the client device via a network.

17. The system of claim 13, wherein the instructions further cause the at least one computing device to at least receive an identification of the specific military installation from a user through a user interface.

18. The system of claim 13, wherein the identifier of the military installation feature is received in response to a user selecting the identifier via a user interface rendered by the client device.

19. The system of claim 13, wherein the identifier is a building number, and the military installation feature is a building.

20. The system of claim 13, wherein the identifier is a training area identifier, and the military installation feature is a training area.

* * * * *